(12) United States Patent
Wang et al.

(10) Patent No.: US 8,670,173 B2
(45) Date of Patent: Mar. 11, 2014

(54) SPD FILMS AND LIGHT VALVE LAMINATES WITH IMPROVED DURABILITY

(75) Inventors: Dongyan Wang, Ithaca, NY (US); Steven M. Slovak, North Massapequa, NY (US); Robert L. Saxe, New York, NY (US); Xiao-Ping Chen, East Meadow, NY (US)

(73) Assignee: Research Frontiers Incorporated, Woodbury, NY (US)

( * ) Notice: Subject to any disclaimer, the term of this patent is extended or adjusted under 35 U.S.C. 154(b) by 72 days.

(21) Appl. No.: 13/182,087

(22) Filed: Jul. 13, 2011

(65) Prior Publication Data

US 2012/0013969 A1    Jan. 19, 2012

Related U.S. Application Data

(60) Provisional application No. 61/363,934, filed on Jul. 13, 2010.

(51) Int. Cl.
*G02B 26/00* (2006.01)
*G09G 3/34* (2006.01)

(52) U.S. Cl.
USPC ............ 359/296; 359/507; 359/513; 345/107

(58) Field of Classification Search
USPC ................. 359/245, 296, 452, 507, 512, 513; 156/246, 312, 313, 504, 509, 510, 512; 430/350, 444, 463, 531; 347/112, 153; 345/107; 313/509, 512
See application file for complete search history.

(56) References Cited

U.S. PATENT DOCUMENTS

| 3,243,629 | A | * | 3/1966 | Levetan ........................ 313/512 |
| 3,267,318 | A | * | 8/1966 | Lynch et al. .................. 313/509 |
| 4,247,175 | A | | 1/1981 | Saxe |
| 4,407,565 | A | | 10/1983 | Saxe |
| 4,772,103 | A | | 9/1988 | Saxe |
| 5,409,734 | A | | 4/1995 | Lee et al. |

(Continued)

FOREIGN PATENT DOCUMENTS

WO    WO 2011/033313 A1    3/2011

OTHER PUBLICATIONS

International Search Report mailed Oct. 31, 2011 in corresponding International Application No. PCT/US2011/043797.

(Continued)

*Primary Examiner* — Loha Ben
(74) *Attorney, Agent, or Firm* — Ostrolenk Faber LLP

(57) ABSTRACT

A moisture-resistant suspended particle device film comprising a cured suspended particle device emulsion having a plurality of uncrosslinked droplets of a liquid light valve suspension distributed throughout the cured emulsion; first and second glass or plastic sheets located outwardly from and sandwiching the cured emulsion, wherein located on an inner aspect of each sheet, adjacent the cured emulsion, is a thin, transparent, electrically conductive coating, the coating serving as an electrode to permit passage of an applied electric field through the cured emulsion; and a moisture-resistant barrier located around an entire outer peripheral edge portion of the film, wherein the barrier is comprised of a barrier material that eliminates or at least reduces passage of moisture from outside the film into the cured emulsion, thus preventing development of a light-frame pattern in the film that would otherwise be caused by the moisture. The disclosure also discloses forming a laminate comprising the above-described film, as well as methods of forming such films and laminates.

27 Claims, 4 Drawing Sheets

(56) References Cited

U.S. PATENT DOCUMENTS

| | | | |
|---|---|---|---|
| 5,461,506 | A | 10/1995 | Check, III et al. |
| 5,463,491 | A | 10/1995 | Check, III |
| 5,463,492 | A | 10/1995 | Check, III |
| 5,953,150 | A | 9/1999 | Smarto et al. |
| 6,301,040 | B1 | 10/2001 | Chakrapani et al. |
| 6,407,763 | B1 * | 6/2002 | Yamaguchi et al. ......... 347/112 |
| 6,416,827 | B1 | 7/2002 | Chakrapani et al. |
| 6,436,617 | B1 * | 8/2002 | Wang et al. .................. 430/350 |
| 6,586,165 | B2 * | 7/2003 | Donovan et al. ............. 430/350 |
| 6,673,997 | B2 | 1/2004 | Blieske et al. |
| 6,900,923 | B2 | 5/2005 | Chakrapani et al. |
| 6,936,193 | B2 | 8/2005 | Saxe et al. |
| 7,349,147 | B2 * | 3/2008 | Chopra et al. ................ 359/296 |
| 7,361,252 | B2 | 4/2008 | Slovak et al. |
| 7,492,504 | B2 * | 2/2009 | Chopra et al. ................ 359/296 |
| 7,502,161 | B2 * | 3/2009 | Chopra et al. ................ 359/296 |
| 7,656,576 | B2 * | 2/2010 | Suwabe et al. ............... 359/296 |
| 2005/0227061 | A1 | 10/2005 | Slovak et al. |
| 2009/0323162 | A1 | 12/2009 | Fanton et al. |

OTHER PUBLICATIONS

Written Opinion mailed Oct. 31, 2011 in corresponding International Application No. PCT/US2011/043797.

International Preliminary Report on Patentability dated Jan. 15, 2013 containing Written Opinion of the International Searching Authority dated Oct. 31, 2011 in corresponding International Application No. PCT/US2011/043797.

* cited by examiner

SPD FILMS AND LIGHT VALVE LAMINATES WITH IMPROVED DURABILITY

CROSS-REFERENCE TO RELATED APPLICATION

This application is based on and claims priority to U.S. Provisional Patent Application Ser. No. 61/363,934, filed on Jul. 13, 2010 and entitled "SPD FILMS AND LIGHT VALVE LAMINATES WITH IMPROVED DURABILITY," the entire contents of which are hereby incorporated by reference.

FIELD OF THE INVENTION

The invention is directed to films and laminates of films for use in light valves comprising liquid particle suspensions, which light valves are generally referred to herein as suspended particle devices or SPD light valves, or simply as SPDs. The SPD film is treated to remove trapped moisture, followed by the application of means for preventing moisture from entering the edge of the SPD film pre- and, optionally, post-lamination.

BACKGROUND OF THE INVENTION

SPD light valves have been known for more than seventy years for use in the modulation of light. Such light valves have been utilized in numerous applications during that time including, e.g., alphanumeric displays and television displays; filters for lamps, cameras, displays and optical fibers; and windows, sunroofs, toys, sunvisors, eyeglasses, goggles, mirrors, light pipes and the like to control the amount of light passing therethrough or reflected therefrom as the case may be. Examples of windows include, without limitation, architectural windows for commercial buildings, greenhouses and residences, windows, visors and sunroofs for automotive vehicles, boats, trains, planes and spacecraft, windows for doors including peepholes, and windows for appliances such as ovens and refrigerators including compartments thereof.

As used herein, the term "light valve" describes a cell formed of two walls that are spaced apart by a small distance, with at least one wall being transparent. The walls have electrodes thereon, usually in the form of transparent, electrically conductive coatings. Optionally the electrodes on the walls may have thin transparent dielectric overcoatings thereon. The cell contains a light-modulating element (sometimes herein referred to as an activatable material), which may, without limitation, be a liquid suspension of particles. Alternately, all or a portion of the entire element may comprise a plastic film in which droplets of a liquid suspension of particles are distributed.

The liquid suspension (sometimes herein referred to as a light valve suspension or as a liquid light valve suspension) comprises small particles suspended in a liquid suspending medium. In the absence of an applied electrical field, the particles in the liquid suspension assume random positions due to Brownian movement. Hence, a beam of light passing into the cell is reflected, transmitted or absorbed depending upon the cell structure, the nature and concentration of the particles and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state.

For many applications it is preferable for all or part of the activatable material, i.e., the light modulating element, to be a plastic film rather than a liquid suspension. For example, in a light valve used as a variable light transmission window, a plastic film in which droplets of liquid suspension are distributed is preferable to a liquid suspension alone because hydrostatic pressure effects, e.g., bulging associated with a high column of light suspension, can be avoided through use of a film and the risk of possible leakage can also be avoided. Another advantage of using a plastic film is that, in a plastic film, the particles are generally present only within very small droplets and, hence, do not noticeably agglomerate when the film is repeatedly activated with a voltage.

A light valve film (also sometimes herein referred to as an SPD film) as used herein means a film or sheet, or more than one thereof, comprising a suspension of particles used or intended for use in an SPD light valve. Such light valve film usually comprises a discontinuous uncrosslinked phase of a liquid comprising dispersed particles, termed a liquid light valve suspension, such discontinuous phase being dispersed throughout a cured continuous phase enclosed within one or more rigid or flexible solid films or sheets. Cured emulsion, which forms part of a light valve film, is sometimes also referred to as a film or film layer. The light valve film and/or a laminate of the light valve film may also comprise one or more additional layers such as, without limitation, a film, coating or sheet or combination thereof, which may provide the light valve film with one or more of, for example, (1) scratch resistance, (2) protection from ultraviolet radiation, (3) reflection of infrared energy, (4) electrical conductivity for transmitting an applied electric or magnetic field to the activatable material, (5) dielectric overcoatings, color tinting and acoustic control.

A common (but non-limiting) construction for an SPD film may comprise, for example, five layers, namely, in order from a first side to a second, opposed side: (1) a first sheet of polyethylene terephthalate ("PET") plastic, conveniently 5-7 mils in thickness, (2) a very thin transparent, electrically conductive coating of indium tin oxide ("ITO"), acting or capable of acting as an electrode, on said first sheet of PET, (3) a layer of cured (i.e., cross-linked) SPD emulsion, usually 2-5 mils in thickness and, (4) a second ITO coating acting or capable of acting as an electrode on (5) a second PET plastic substrate. As stated above, additional layers, which provide other functions, may optionally be added to the five-layer SPD film described above. Typically, copper foil, conductive fabric or the like are affixed to the electrodes so that they extend beyond the perimeter of the SPD film for convenient connection to a suitable voltage source. Furthermore the SPD film can be laminated, for example, with transparent hot melt adhesive interlayer films and/or glass or thicker transparent plastic sheets to provide strength and rigidity and to protect various parts of the combined unit from environmental stresses which may, otherwise, damage its performance characteristics.

U.S. Pat. No. 5,409,734 exemplifies a type of non-crosslinked light valve film that is made by phase separation from a homogeneous solution. Light valve films made by crosslinking (curing) of emulsions are also known. The methods of the present invention are specifically directed to the use of the latter type of film, i.e., film comprising a layer formed by cross-linking an emulsion, and to laminated films produced therewith. See, for example, U.S. Pat. Nos. 5,463,491 and 5,463,492, and U.S. Pat. No. 7,361,252, all of which are assigned to the assignee of the present invention. Various types of SPD emulsions, and methods of curing same, are described in U.S. Pat. Nos. 6,301,040, 6,416,827, and 6,900,923 B2, all of which are assigned to the assignee of the present invention.

A non-limiting example of such a film from Example 5 of U.S. Pat. No. 6,900,923 B2 follows: 0.002 g of Irgacure 819 (Ciba Specialty Chemicals) photoinitiator ("PI") was dissolved in 2 mL of chloroform and added to 1 g of the matrix polymer described in Example 1. The PI solution was thoroughly mixed with the matrix polymer and the solvent chloroform was removed by placing the mixture inside of a vacuum oven for 30 minutes at 60° C. To this was added 0.62 g of polyiodide crystal paste containing the lauryl methacrylate/HEMA suspending polymer (0.56 g, as synthesized in example 3). The resulting mixture was thoroughly mixed and the emulsion obtained was applied onto a conductive coated polyester substrate as a 2 mil thick coating using a doctor blade, mated with a blank conductive coated polyester substrate and cured with ultraviolet radiation (8600 mJ/cm$^2$/min) for 2 min and 30 seconds.

Such films and variations thereof may be cured through cross-linking brought about by exposing the films to (1) ultraviolet radiation, (2) electron beams or (3) heat.

All of the patents and patent applications and other references cited in this application are incorporated herein by reference.

Further to the above, a variety of liquid light valve suspensions are well known in the art and such suspensions are readily formulated according to techniques well known to one of ordinary skill therein. The term liquid light valve suspension, as noted above, when used herein means a liquid suspending medium in which a plurality of small particles are dispersed. The liquid suspending medium comprises one or more non-aqueous, electrically resistive liquids in which there is preferably dissolved at least one type of polymeric stabilizer that acts to reduce the tendency of the particles to agglomerate and to keep them dispersed and in suspension.

Liquid light valve suspensions useful in the present invention may include any of the so-called prior art liquid suspending media previously proposed for use in light valves for suspending the particles, which are well-known to those working in this field. Liquid suspending media known in the art which are useful herein include, but are not limited to, the liquid suspending media disclosed in U.S. Pat. Nos. 4,247,175, 4,407,565, 4,772,103, 5,409,734, 5,461,506, 5,463,492, and 6,936,193 B2, the disclosures of which are incorporated herein by reference. In general one or both of the suspending medium or a polymeric stabilizer typically dissolved therein is chosen so as to maintain the suspended particles in gravitational equilibrium.

The polymeric stabilizer, when employed, can be a single type of solid polymer that bonds to the surface of the particles, but which also dissolves in the non-aqueous liquid(s) which comprise the liquid suspending medium. Alternatively, there may be two or more solid polymeric stabilizers serving as a polymeric stabilizer system. For example, the particles can be coated with a first type of solid polymeric stabilizer such as nitrocellulose which, in effect, when dissolved provides a plain surface coating for the particles, together with one or more additional types of solid polymeric stabilizer that when dissolved, bond to or associate with the first type of solid polymeric stabilizer and also dissolve in the liquid suspending medium to provide dispersion and steric protection for the particles. Also, liquid polymeric stabilizers may be used to advantage, especially in SPD light valve films, as described for example in U.S. Pat. No. 5,463,492.

Inorganic and organic particles may be used in a light valve suspension, and such particles may be either light absorbing or light reflecting in the visible portion of the electromagnetic spectrum.

Conventional SPD light valves have generally employed particles of colloidal size. As used herein the term colloidal means that the particles generally have a largest dimension averaging 1 micron or less. Preferably, most polyhalide or non-polyhalide types of particles used or intended for use in an SPD light valve suspension will have a largest dimension which averages 0.3 micron or less and more preferably averages less than one-half of the wavelength of blue light, i.e., less than 2000 Angstroms, to keep light scatter extremely low.

Prior art SPD films and laminates incorporating such SPD film(s) can develop a pattern at the perimeter of the SPD film where a lighter blue area or "light frame" is visible. The light frame develops when the SPD film or a laminate of the SPD film is exposed to heat and/or moisture.

As mentioned above, prolonged exposure of SPD film or laminates of SPD film to elevated temperatures and/or humidity can cause a light frame to appear. U.S. Pat. No. 7,361,252, assigned to the assignee of the present invention, describes the use of adhesive tape to seal the edges of the SPD film to prevent the hot melt adhesive interlayer material from coming into contact with the cured SPD emulsion. However, the tape in that instance was used as a physical barrier to the interlayer material and did not possess moisture resistant properties.

Another deficiency of prior art SPD films was the tendency of the cured emulsion to absorb moisture through the exposed edge of the SPD film over time if measures were not taken to isolate the SPD film from sources of such moisture. Subsequent exposure of the SPD film or laminates of the SPD film to elevated temperatures and/or humidity could lead to a defect such as the light frame mentioned above.

PCT/GB2010/051566 describes drying the interlayer plies to a predetermined moisture content to reduce or eliminate degradation of an SPD. However, this application does not consider the moisture content in the SPD film itself, moisture-resistant barrier materials to prevent moisture from contacting the SPD film or moisture-resistant border materials to prevent moisture from entering the SPD laminate.

The inventors have, therefore, undertaken to develop a methodology for making light valves of the type described herein wherein the occurrence of undesirable light frames is eliminated or at least substantially reduced.

SUMMARY OF THE INVENTION

The appearance of light frame(s) is thus eliminated or at least substantially reduced, in a first embodiment, by: (1) removing at least some of any moisture trapped in the SPD film, and (2) providing a moisture resistant barrier around the edge of the SPD film prior to any incorporation of such film into a SPD laminate. The non-limiting examples following below use specific brands of moisture resistant tape but it should be appreciated that any tape that has or is described as having moisture resistant properties comprising hydrophobic materials that repel water and moisture, including, but not limited to, silicones, fluoropolymers, acrylic polymers, urethanes and epoxies, are suitable for use as the barrier around the edge of the SPD film. Lamination conditions and practices known to those skilled in the art, as well as various configurations of SPD film with multiple plies of interlayer/glass or plastic substrates and the inclusion of additional layers described earlier can be employed in any of the embodiments described herein. A non-limiting summary of the procedure for laminating SPD films is described in U.S. Pat. No. 7,361, 252, assigned to the assignee of the present invention. The procedure involves creating a "stack" comprising in sequence a first glass sheet, a first sheet of interlayer, the SPD film comprising cured SPD emulsion sandwiched between two ITO-coated PET substrate sheets, a second sheet of interlayer and a second glass sheet, all positioned substantially congruent to one another. The stack is placed in a vacuum bag within a Carver Press and a strong vacuum is applied (greater than 29 inches of mercury). The platens of the press are then arranged to touch the outsides of the unlaminated stack and their temperature elevated to affect melting of the interlayers within the stack. The platens are then cooled to solidify the interlayers that adheres the stack into an SPD laminate.

In a further embodiment wherein the film is further laminated to one or more additional films, plies, etc. positioned outwardly from such film, steps are additionally taken to maintain low moisture content in the interlayer material used in forming the laminate including the SPD film and moisture resistant bonding materials are added to form a border sealing the edge of the SPD laminate thus produced. Although specific brands of moisture resistant bonding material was used in the non-limiting examples to follow, it should be appreciated that any bonding material comprising hydrophobic materials that repel water and moisture, including, but not limited to, silicones, fluoropolymers, acrylic polymers, urethanes and epoxies, are suitable for use as the border around the edge of the SPD laminate. Thus, this embodiment comprises: (1) removing some or all of any trapped moisture from the SPD film; (2) providing a moisture resistant barrier around the film; (3) laminating the film to one or more additional films, plies, layers, etc.; and (4) further sealing the edge of the resultant SPD laminate with an additional moisture-resistant bonding material.

As noted above, the moisture content of interlayer material(s) used in forming the SPD laminate is reduced as far as practicable to prevent, or at least reduce, migration of moisture into the film. Suitable interlayer materials for use in SPD laminates include, but are not limited to, ethylene vinylacetate, polyvinylbutyral and polyurethane.

DETAILED DESCRIPTION OF THE INVENTION

Figure 1:
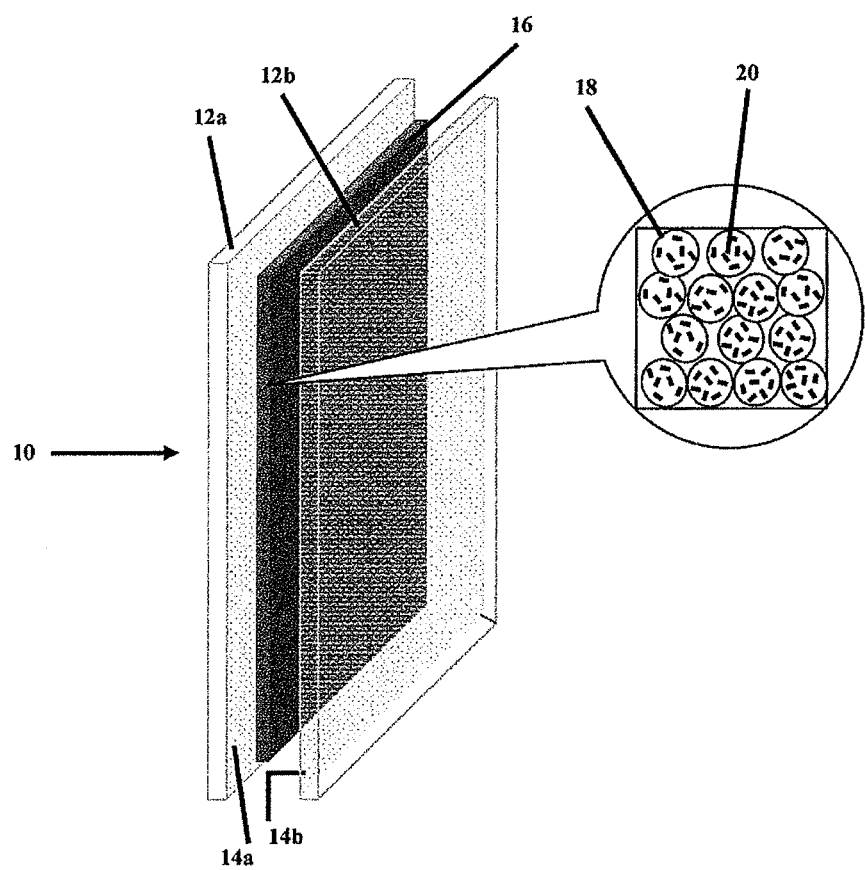
FIG. 1 is an exploded side view of a suspended particle device (SPD) light valve film.

SPD films and laminates incorporating such SPD films were exposed to elevated temperatures under the given conditions and the following results were observed:

SPD films exposed to a 100° C. oven at ambient humidity developed a light frame in 4 days.

SPD films placed in a vacuum desiccator with a vacuum of approximately 0.001 Torr were exposed to an 80° C. oven for 4 days followed by a 90° C. oven for 14 days whereupon no light frame was observed. This demonstrates that the combination of moisture (from the air) and elevated temperatures was responsible for the appearance of the light frame, with the moisture being the major factor.

SPD films that were laminated between two plies of glass with sheets of interlayer material, using the laminating conditions described in U.S. Pat. No. 7,361,252, assigned to the assignee of the present invention, did not develop a light frame. However, exposure of these SPD laminates to a 100° C. oven did result in the appearance of a light frame in 4 days.

Thus, in order to further investigate the effect of moisture on the appearance of a light frame in SPD films and laminates of SPD films, films and laminates with different configurations were placed in an upper portion of a chamber that had a reservoir of water in the lower section thereof. A ceramic plate with holes permitting the passage of water vapor prevented the SPD films and laminates from coming in direct contact with the liquid water in the bottom section of the desiccator. Placing this chamber in a 60° C. oven creates a high temperature, high humidity environment that SPD films and SPD laminates would not normally be exposed to in the field. However, these extreme conditions were created so that meaningful test results would be obtained in a reasonable period of time. The moisture-saturated chamber containing the samples was placed in a 60° C. oven and the following results were observed:

SPD films without edge protection placed in the moisture-saturated chamber at 60° C. developed a light frame after 22 hours of exposure.

SPD films with transparent adhesive tape as edge protection placed in the moisture-saturated chamber at 60° C. developed a light frame after 24 hours of exposure.

SPD films with a moisture-resistant transparent acetal copolymer adhesive tape (McMaster Part #3402A14 manufactured by McMaster-Carr, Robbinsville, N.J.) as edge protection placed in the moisture-saturated desiccator at 60° C. developed a light frame after 48 hours of exposure.

SPD films with Teflon transparent tape with silicone adhesive (McMaster Part #7562A11 manufactured by McMaster-Carr, Robbinsville, N.J.) as edge protection placed in the moisture-saturated desiccator at 60° C. developed a light frame after 48 hours of exposure.

The results discussed above demonstrate that the presence of moisture-resistant tape around the edges of the SPD film delayed but did not prevent the light frame.

In order to further investigate the effect of removing the moisture from the SPD film and interlayers on the appearance of a light frame in SPD films and laminates of SPD films, SPD films and interlayers were placed in the upper portion of a desiccator that had a reservoir of desiccant in the bottom section. The interlayers were previously stored in a humidity controlled area where the relative humidity is <25%. The desiccant can be any known type including, but not limited to, silica gel, calcium oxide, calcium sulfate and molecular sieves. A ceramic plate with holes prevented the SPD films and laminates from coming in direct contact with the desiccant in the bottom section of the desiccator. The dry desiccator containing the SPD films and interlayers was evacuated to a pressure of 0.001 Torr and maintained at this vacuum for 3 days. The above-described drying techniques are set forth only for the purpose of illustrating the invention. That is, a variety of alternate techniques for achieving the same end would be well known among those having an ordinary level of skill in this art, which techniques are also deemed as being encompassed within the present invention. These dried SPD films and laminates comprising these dried SPD films and dried interlayers with different configurations were placed in the upper portion of a desiccator that had a reservoir of water in the bottom section of the desiccator. The moisture-saturated desiccator containing the samples was placed in a 60° C. oven and the following results were observed:

Dried SPD films with a moisture-resistant transparent acetal copolymer adhesive tape (McMaster Part #3402A14)

as a barrier placed in the moisture-saturated chamber at 60° C. developed a light frame after 72 hours of exposure.

Dried SPD films with Teflon transparent tape with silicone adhesive (McMaster Part #7562A11) as a barrier placed in the moisture-saturated chamber at 60° C. developed a light frame after 48 hours of exposure.

Another dried SPD film with Teflon transparent tape with silicone adhesive (McMaster Part #7562A11) as a barrier was laminated between two pieces of glass with two dried sheets of Ethylene Vinyl Acetate (EVA) interlayer (Sekisui S-LEC EN, 16 mils thick, manufactured by Sekisui America, Mount Laurel N.J.). The resulting SPD laminate was placed in an 85° C. oven at ambient humidity and has not developed a light frame after 394 days of exposure.

Another dried SPD film with Teflon transparent tape with silicone adhesive (McMaster Part #7562A11) as a barrier was laminated between two pieces of glass with two dried sheets of Polyurethane interlayer (Deerfield A4700, 25 mils thick, manufactured by Deerfield Urethane, a Bayer company, Whately Mass.). The resulting SPD laminate was placed in the moisture saturated chamber at 60° C. and only developed a light frame after 78 days of exposure.

Still another dried SPD film with Teflon transparent tape with silicone adhesive (McMaster Part #7562A11) as a barrier was laminated between two pieces of glass with two dried sheets of Polyurethane interlayer (Deerfield A4700, 25 mils thick). Additionally, the edge of the SPD laminate was sealed with a border of hot melt glue (Thermogrip GS12, manufactured by Bostik of Wauwatosa, Wis.). The resulting SPD laminate was placed in the moisture saturated chamber at 60° C. and only developed a light frame after 116 days of exposure.

The figures contained in this application are provided to illustrate several possible constructions of SPD films and SPD laminates produced according to the invention. They should not be construed as limiting the invention, however, as numerous alternate arrangements, i.e., optionally utilizing a variety of different materials well known among those familiar with the SPD art, will readily suggest themselves to those having at least an ordinary level of skill in this field.

FIG. 1 provides an exploded side view of a suspended particle device (SPD) light valve film (10) constituting, in one possible non-limiting embodiment, (from a first side to a second, opposed side) (a) a first sheet (12a) of polyethylene terephthalate ("PET") plastic, conveniently 5-7 mils in thickness, (b) a very thin transparent, electrically conductive coating of indium tin oxide ("ITO") (14a), acting or capable of acting as an electrode, on an inner surface of said first sheet of PET (12a), (c) a layer of cured (i.e., cross-linked) SPD emulsion (16), usually 2-5 mils in thickness having a plurality of uncrosslinked droplets of a liquid light valve suspension (18), containing particles (20) distributed throughout the cured emulsion and, (d) a second ITO coating (14b) acting or capable of acting as an electrode on (e) an inner surface of a second PET plastic substrate (12b).

Figure 2:
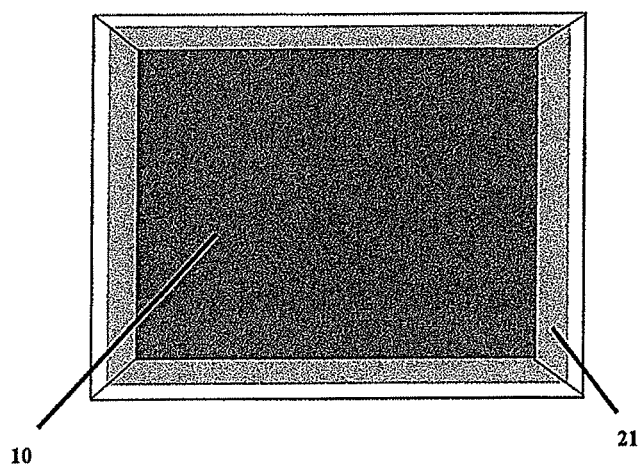
FIG. 2 is a top plan view of a taped SPD light valve film.

FIG. 2 is a top plan view of a taped SPD light film according to the invention. The film (10) is surrounded around its entire outer peripheral edge by a 'seal' (21) formed of at least one layer of a moisture-resistant barrier material. Seal (21) may in one embodiment be comprised of only a single member, extending entirely around the outer edge(s) of the film (10), or else in an alternate embodiment it may be formed of two or more such members, e.g., strips, joined together to form a continuous seal (21) around the entire periphery.

Figure 3:
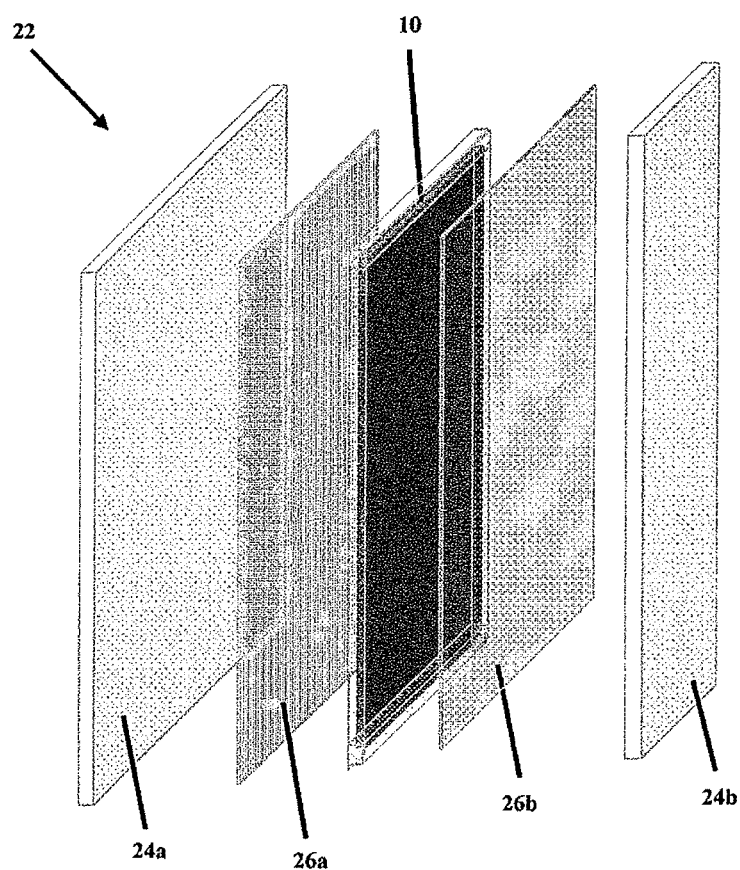
FIG. 3 is an exploded side view of a lamination of a taped SPD light valve film.

FIG. 3 is an exploded side view of a non-limiting example of a lamination (22) of a taped SPD light valve film. The lamination comprises, starting at the left-hand side, a first additional ply (24a) of glass or plastic added to provide one or more of, as previously explained, for example, scratch resistance, protection from ultraviolet radiation, reflection of infrared energy, electrical conductivity for transmitting an applied electric or magnetic field to the activatable material of which the film is comprised, dielectric overcoatings, color tinting and acoustic control. Continuing from left to right, the lamination (22) also includes a first adhesive interlayer (26a) formed of ethylene vinyl acetate (EVA) for bonding ply (24a) to film (10), then, beyond film (10) there is a second adhesive interlayer (26b) formed of ethylene vinyl acetate (EVA) and a second additional ply of glass or plastic (24b), wherein interlayer (26b) serves to bond ply (24b) to the opposed side of the film (10).

Figure 4:
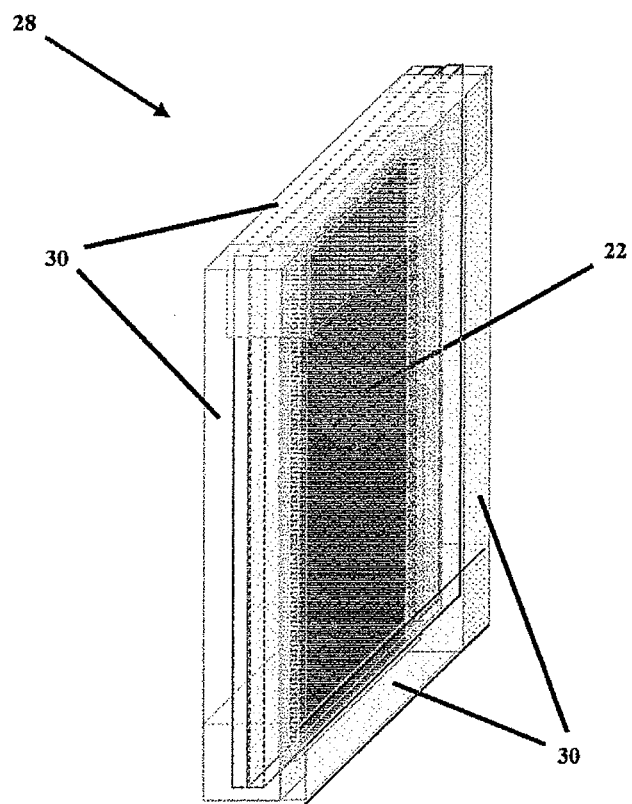
FIG. 4 is a side view of a taped SPD lamination provided with a moisture-resistant barrier.

Further to the above, FIG. 4 is a side view of a taped SPD lamination provided with a moisture-resistant outer barrier according to the invention. This construct is designated as (28). No. (22) is a lamination of a taped SPD light valve film. The laminate is further surrounded with a barrier or border of moisture-resistant material (30) provided for the same purpose as seal (21). Material (30) may be comprised of the same, or a different moisture-resistant material than is used to form seal (21). Further, in like manner to seal (21), material (30) may be formed of a single member extending completely around the entire outer periphery of the SPD laminate, or alternately it may be formed with a plurality of strips joined together to extend completely around such periphery. Many moisture-resistant adhesive materials are known in the art and any materials that will serve the intended purpose will prove useful in producing the films and laminates according to the present invention.

What is claimed is:

1. A moisture-resistant suspended particle device (SPD) film comprising:
    a) a cured suspended particle device emulsion having a plurality of uncrosslinked droplets of a liquid light valve suspension distributed throughout the cured emulsion;
    b) first and second glass or plastic sheets, said sheets located outwardly from and sandwiching said cured emulsion wherein, located on an inner aspect of each of said first and said second sheet, adjacent said cured emulsion, is a thin, transparent electrically conductive coating, said coatings serving as an electrode to permit passage of an applied electric field through said cured emulsion, and
    c) a moisture-resistant barrier located around an entire outer peripheral edge portion of said sheets, wherein the barrier is comprised of a barrier material that eliminates or at least reduces passage of moisture from outside said sheets into the cured emulsion, thus preventing development of a light frame pattern in said cured emulsion otherwise caused by said moisture.

2. The moisture-resistant SPD film according to claim 1, wherein the moisture-resistant barrier comprises at least one hydrophobic material that repels water and moisture.

3. The moisture-resistant SPD film according to claim 2, wherein the hydrophobic material is at least one selected from the group consisting of silicones, fluoropolymers, acrylic polymers, urethanes and epoxies.

4. The moisture-resistant SPD film according to claim 1, wherein the moisture-resistant barrier is comprised of a single member extending entirely around the outer peripheral edge portion of said sheets.

5. The moisture-resistant SPD film according to claim 1, wherein the moisture-resistant barrier is formed of two or more separate members, said members positioned adjacent one another to form said barrier extending entirely around the outer peripheral edge portion of the sheets.

6. The moisture-resistant SPD film according to claim 1, wherein the first and second sheets are comprised of polyethylene terephthalate (PET) plastic.

7. The moisture-resistant SPD film according to claim 1, wherein the electrically conductive coating comprises indium tin oxide (ITO).

8. The moisture-resistant SPD film according to claim 1, further comprising one or more additional plies laminated to outer opposed surfaces of the sheets, thus forming an SPD laminate, said additional plies comprising sheets formed from glass or plastic, said additional plies providing to said laminate at least one selected from the group consisting of scratch resistance, protection from ultraviolet radiation and reflectance of infrared energy.

9. The moisture-resistant SPD laminate according to claim 8, wherein the one or more additional plies are laminated to said sheets via at least one adhesive interlayer located between each said sheet and each additional ply.

10. The moisture-resistant SPD laminate according to claim wherein said at least one adhesive interlayer is formed from a material selected from the group consisting of ethylene vinylacetate, polyvinylbutyral and polyurethane.

11. The moisture-resistant SPD laminate according to claim 8, wherein the laminate is further surrounded along its entire outer peripheral edge by a border formed of a moisture-resistant border material, wherein the border material reduces or eliminates passage into the laminate, of moisture from outside of said laminate.

12. The moisture-resistant SPD laminate according to claim 11, wherein the moisture-resistant border material comprises at least one hydrophobic material that repels water and moisture.

13. The moisture-resistant SPD laminate according to claim 12, wherein the hydrophobic material is at least one selected from the group consisting of silicones, fluoropolymers, acrylic polymers, urethanes and epoxies.

14. The moisture-resistant SPD laminate according to claim 11, wherein said border material is the same, or a different moisture-resistant material than that used to form the barrier surrounding said sheets.

15. The moisture-resistant SPD laminate according to claim 11, wherein the border is comprised of a single member extending entirely around the outer peripheral edge portion of said laminate.

16. The moisture-resistant SPD laminate according to claim 11, wherein the border is formed of two or more separate members, said members positioned adjacent one another to form said border extending entirely around the outer peripheral edge portion of the laminate.

17. A method for preventing formation of a light frame on a surface of a suspended particle device (SPD) film, said method comprising:
   a) providing a cured suspended particle device film, said film comprising a cured suspended particle device emulsion having a plurality of uncrosslinked droplets of a liquid light valve suspension distributed throughout said cured emulsion, said film further comprising first and second glass or plastic sheets located outwardly from and sandwiching said cured emulsion, wherein, located on an inner aspect of both said first and said second sheet, adjacent the cured emulsion, is a thin, transparent, electrically conductive coating that serves as an electrode to permit passage of an applied electric field through the cured emulsion; and
   b) providing a moisture-resistant barrier, said barrier comprising at least one hydrophobic material, around an entire outer peripheral edge portion of said film, wherein the barrier is comprised of a material that eliminates or at least reduces passage of moisture from outside said film into the cured emulsion, thus preventing development of a light frame pattern in said film otherwise caused by said moisture.

18. The method according to claim 17, wherein the hydrophobic material is at least one selected from the group consisting of silicones, fluoropolymers, acrylic polymers, urethanes and epoxies.

19. The method according to claim 17, wherein the moisture-resistant barrier is formed of a single member extending entirely around an outer peripheral edge portion of said film.

20. The method according to claim 17, wherein the moisture-resistant barrier is formed of two or more separate members, said members positioned adjacent one another to form said barrier extending entirely around an outer peripheral edge portion of said film.

21. The method according to claim 17, further comprising subjecting said film to a drying step before providing the moisture-resistant barrier around said outer peripheral edge, wherein said drying step removes all or at least a portion of any moisture present in said film prior to installation of said barrier.

22. The method according to claim 17, which further comprises incorporating said film into a laminate, said laminate further comprising, in addition to the film, one or more additional plies laminated to outer opposed surfaces of the film, said additional plies comprising sheets formed from glass or plastic, said additional plies providing to said laminate at least one selected from the group consisting of scratch resistance, protection from ultraviolet radiation and reflectance of infrared energy, and surrounding around an entire peripheral edge portion of said laminate a moisture-resistant border formed from a moisture-resistant border material that eliminates or at least reduces passage of moisture from outside said laminate into said laminate, thereby preventing development of a light frame pattern in a film portion of said laminate.

23. The method according to claim 22, wherein the one or more additional plies are laminated to the film by at least one adhesive interlayer wherein at least one said interlayer is located between the film and each additional ply.

24. The method according to claim 23, wherein said at least one adhesive interlayer is formed from a material selected from the group consisting of ethylene vinylacetate, polyvinylbutyral and polyurethane.

25. The method according to claim 23, further comprising subjecting said at least one adhesive interlayer to a drying step before providing the moisture-resistant border around the outer peripheral edge of the laminate, wherein said drying step removes all or at least a portion of any moisture present in said laminate prior to installation of said border.

26. The method according to claim 22, wherein the moisture-resistant border is formed from a single member extending entirely around an outer peripheral edge portion of said laminate.

27. The method according to claim 22, wherein the moisture-resistant border is formed of two or more separate members, said members positioned adjacent one another to form said border extending entirely around an outer peripheral edge portion of said laminate.

* * * * *